Patented May 23, 1950

2,509,141

UNITED STATES PATENT OFFICE 2,509,141

AIRCRAFT CONTROL SURFACE LOCK

Charles L. Freel, Detroit, Mich., assignor to Lord Manufacturing Company, Erie, Pa., a corporation of Pennsylvania Application November 22, 1948, Serial No. 61,388

3 Claims. (Cl. 244—1)

To prevent damage of control surfaces by gust wind forces, it is required that the control surfaces be positively locked while the aircraft is on the ground. In the locked position, the aircraft is not maneuverable and while there is an interlock preventing take off while the controls are locked, serious accidents have occurred when a pilot has attempted to take off with the control surfaces locked. This invention is intended to provide a cushioned lock for the control surfaces which adequately protects the controls from gust wind forces and does not prevent take off even though the lock is not released.

Figure 1:
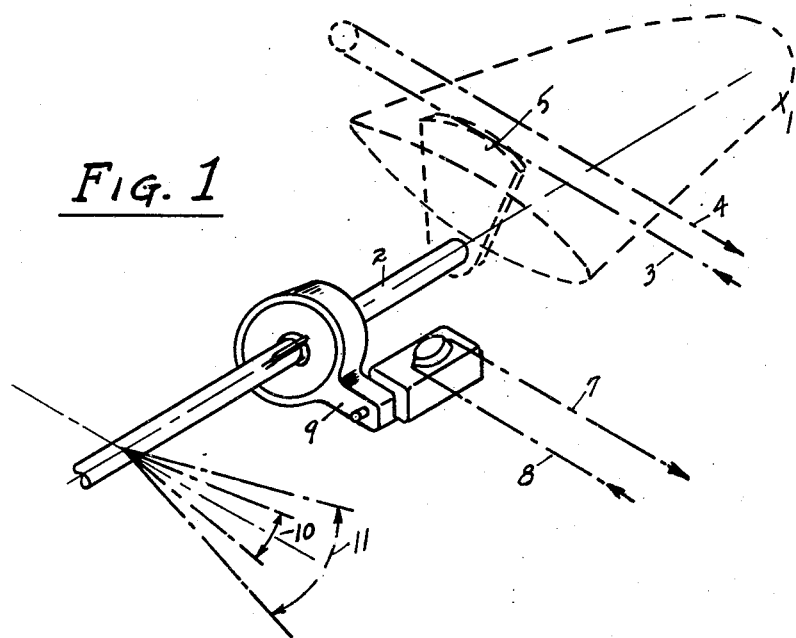
Figure 2:
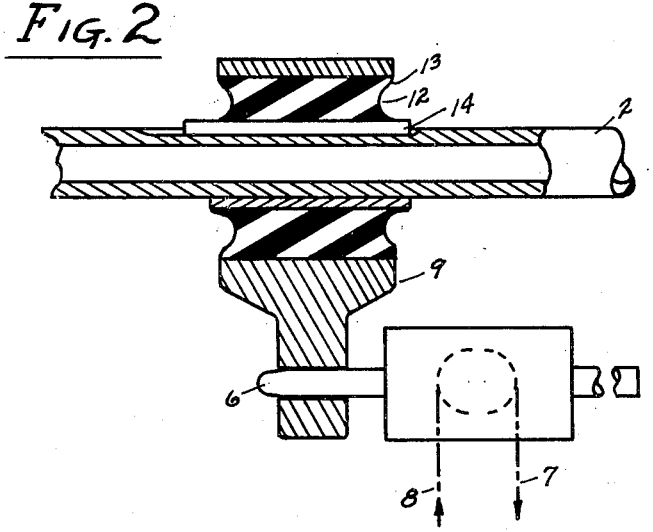

In the drawing, Fig. 1 is a diagrammatic perspective of an aircraft control surface and the associated control and control surface lock, and Fig. 2 is a section through the control surface lock.

In Fig. 1, I indicates an aircraft wing control surface carried on a shaft 2 and pivoted by means of up and down elevator control cables 3 and 4 having a suitable mechanical connection to the shaft 2, diagrammatically indicated at 5. The up and down control cables position the control surface so as to properly maneuver the aircraft. The control surfaces and controls are, or may be, of common construction.

When the aircraft is on the ground it is necessary that the control surfaces be protected from gust wind forces. This ordinarily has been accomplished by a positive lock associated with the control surfaces which holds the control surfaces in a fixed position. Diagrammatically the lock comprises a pin 6 controlled by lock and unlock cables 7 and 8 which move the pin in and out of engagement with a crank 9 on the shaft 2. If the crank 9 is positively fixed to the shaft, as has been customary, the control surfaces cannot be moved until the lock is released. This completely destroys the maneuverability of the aircraft.

In the present construction a torsion joint is interposed between the crank and the shaft, permitting rotation of the shaft 2 through an angle 10 which is somewhat less than the angle 11 through which the shaft 2 is normally operated, but is sufficient to permit take off before release of the control surface lock. The torsion joint comprises a cylinder of rubber 12 bonded at its outer surface to a cylindrical surface 13 on the crank, and at its inner surface to a metal sleeve 14 fixed to the control shaft 2. With this arrangement the rubber resiliently resists gust wind forces on the control surfaces and affords sufficient protection to prevent damage to the control surfaces. At the same time, because the control shaft has a cushion lock instead of a positive lock, the aircraft has sufficient maneuverability to permit take off, even though the pilot inadvertently attempts take off before releasing the control surface lock.

What I claim as new is:

1. In an aircraft, a control surface, a control for positioning the surface, a lock for holding the control surface in a fixed position, and a yieldable connection between the lock and the control surface permitting movement of the control surface by its control sufficient for limited maneuverability of the aircraft in the locked position.

2. In an aircraft, a control surface having a shaft, a control connected to the shaft for tilting the control surface, a torsion spring joint, and a lock connected to the shaft through the torsion joint, the joint permitting movement of the control surface by its control sufficient for limited maneuverability of the aircraft in the locked position.

3. In an aircraft, a control surface having a shaft, a control connected to the shaft for tilting the control surface, a sleeve of resilient material surrounding and having its inner surface bonded to the shaft, and a lock fixed to the outer surface of the sleeve for yieldably holding the control surface in a fixed position, the sleeve having sufficient resilience to accommodate limited movement of the control surface by its control sufficient for limited maneuverability of the aircraft in the locked position.

CHARLES L. FREEL.

No references cited.